G. H. CUSHING.
HAND-PIECE FOR DENTAL-ENGINES.

No. 169,342. Patented Nov. 2, 1875.

Witnesses:

Inventor:
George H. Cushing
by his attorney
Wm D. Baldwin

UNITED STATES PATENT OFFICE.

GEORGE H. CUSHING, OF CHICAGO, ILLINOIS, ASSIGNOR TO SAMUEL S. WHITE, OF PHILADELPHIA, PENNSYLVANIA.

IMPROVEMENT IN HAND-PIECES FOR DENTAL ENGINES.

Specification forming part of Letters Patent No. 169,342, dated November 2, 1875; applicated filed September 21, 1875.

*To all whom it may concern:*

Be it known that I, GEORGE H. CUSHING, of Chicago, Illinois, have invented certain new and useful Improvements in Disk and Tool Carriers for Dental Engines, of which the following is a specification:

My invention relates to a carrier of that class adapted for the support of rotary disks, burrs, and other revolving tools; and my objects are to render the disk or tool adjustable in the carrier at any desired angle thereto, and to insure steadiness of movement of the disk or tool while in operation.

The subject-matter claimed will hereinafter specifically be designated.

Figure 1:
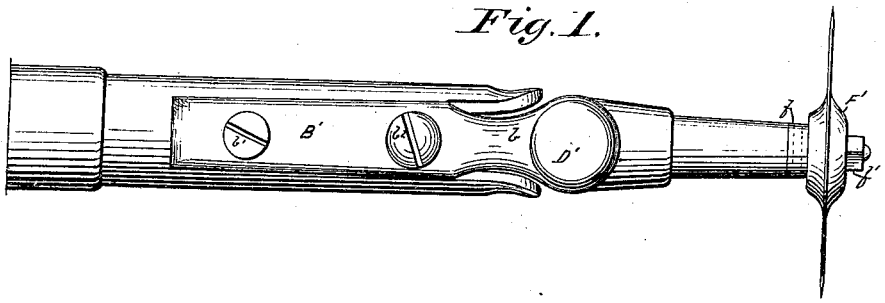
Figure 2:
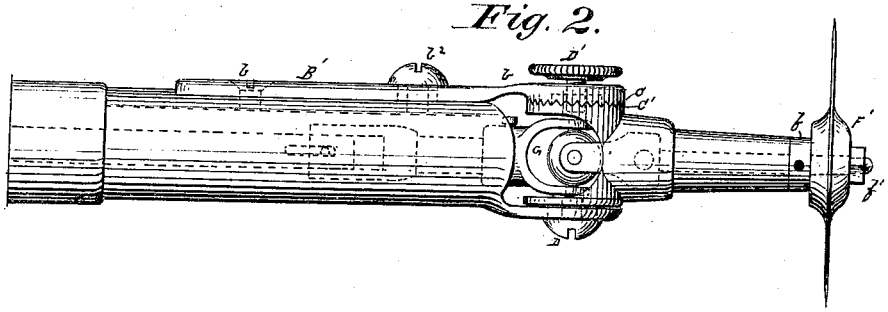
Figure 3:
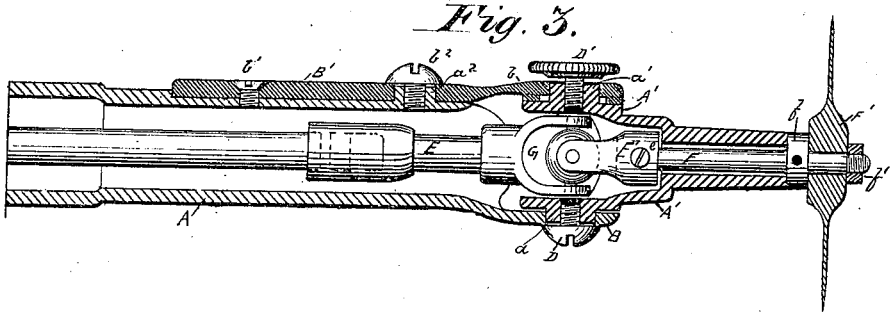
Figure 4:
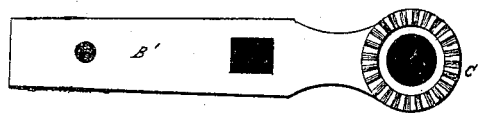

In the accompanying drawings, which represent, on an enlarged scale, my improvements in connection with a disk or emery-wheel, Figure 1 is a plan or longitudinal view; Fig. 2, a longitudinal elevation; Fig. 3, a longitudinal central section; and Fig. 4, a view of the inner face or under side of the removable adjustable bearing and clamping-arm.

A tubular support or hand-piece is composed of two parts, A A', the outer section A' of which constitutes the tool-carrier, and is hinged to turn upon the main section A by pivots or trunnions $a$ $a'$, formed, in this instance, in one piece, with the end section of the hand-piece. The trunnion $a$ fits so as to turn freely in a bearing in an arm or lug, B, projecting from the main section of the hand-piece, while the trunnion $a^1$ has its bearing in a yielding or spring arm, $b$, formed, by preference, by the projecting end of a plate, B', secured upon the main part of the hand-piece by screws $b^1$ $b^2$ to admit of its removal or replacement. This plate may be partially countersunk in the hand-piece, which is shown as formed with a polygonal stud, $a^2$, to fit into a correspondingly-shaped hole in the plate, thus preventing lateral strain on the screws. The under side or inner face of the arm $b$ is serrated or provided with a ring of teeth, C. Corresponding notches or serrations C' are formed upon the hinged portion A' of the hand-piece around the pivot $a'$. The sections of the hand-piece may, it will thus be seen, be locked together by clamping these serrated surfaces against each other. A screw, D, serves to prevent the accidental withdrawal of the trunnion $a$ from its bearing, as well as to draw it tightly down in place, the head of the screw bearing, it will be seen, upon the shell of the main section of the hand-piece around the trunnion. A pinch or set-screw, D', works in a female screw in the trunnion $a'$, and serves to clamp the serrated faces C C' together to hold the hinged section or carrier in the desired position, relatively to the main section.

By loosening the screw D', the carrier of the hand-piece may be adjusted by slipping the serrations C' past those C, the arm $b$ yielding to permit them to slide one past the other.

By removing the plate B', which, as before described, sustains, by means of its spring-arm, one of the pivots of the hinged section A' of the hand-piece, this section may be removed.

A shaft, E, through which the tool is driven, is rotated in the hand-piece in any suitable well-known way; such as by the flexible shaft of a dental engine, with which it may be connected by well-known means.

To allow of the adjustment of the outer or tool-supporting end of the hand-piece, as before described, it is necessary that the driving-shaft should be capable of flexing in the line of the joint in the hand-piece, or that the tool or its holder should be jointed to the shaft at this point.

I prefer to secure the shank or spindle F of the disk F' to a chuck or tool holder, E', by a screw, $e$, which readily admits of the removal and replacement of the disk, or the substitution of another tool, and to connect this chuck with the shaft E in the line of the joint in the hand-piece by a universal joint, G, of well-known construction, which will admit of the rotation of the tool at any angle to which it may be adjusted by the swinging of the section or carrier A'.

The disk F' may be connected with its spindle in any suitable way, being shown in the drawings as clamped thereon between a collar, $f$, fast on or formed with the disk, and a nut, $f'$. The collar, it will be seen, rotates against or close to the end of the carrier A'.

By removing the screw $e$ the disk and its shank may be withdrawn from the carrier, which, as will be seen, serves as a bearing for the shank to revolve in, and a burring-tool or other tool provided with a like shank inserted in its place.

The hand-piece proper, it will be seen, is somewhat raised or projected out laterally to form the lug B to give ample room to accommodate the joint G and the carrier-section A'. The spring clamping-arm likewise projects out slightly for the same purpose. The hand-piece is recessed or cut away between the lug B and clamp b to give ample play to the swinging section or carrier.

I disclaim the device shown in F. Hickman's Patent, No. 158,377, of January 5, 1875.

I do not broadly claim adjusting the disk or tool at an angle to the hand-piece or driving-shaft, as this is old; but

What I claim as my invention, and desire to secure by Letters Patent, is—

1. The hand-piece constructed, substantially as described, with a tubular main section, a movable clamping-arm mounted thereon, and a movable tubular section pivoted on the main section and clamping-arm, for the purposes specified.

2. The combination, substantially as hereinbefore set forth, of the tubular main section, its clamping-arm, the movable tubular section pivoted on them, and the pinch-screw, whereby the parts may be clamped in any adjustable position.

3. The combination, substantially as hereinbefore set forth, of the tubular main section, its clamping-arm, the movable tubular section carrying the tool-holder, the driving-shaft, and the universal joint connecting the driving-shaft and tool-holder in the line of the joint of the hand-piece, for the purposes specified.

In testimony whereof I have hereunto subscribed my name.

GEORGE H. CUSHING.

Witnesses:
   EDW. S. EVARTS,
   HORATIO M. SMITH.